Feb. 6, 1951

P. W. HARLAND
PRESSURE-INDICATING GAUGE CLOSING
SWITCHES AT SELECTED PRESSURES 2,540,444

Filed April 30, 1948

INVENTOR
PHILIP W. HARLAND
BY Bruno C Lechler
ATTORNEY

INVENTOR
PHILIP W. HARLAND
BY Bruno C Lechler
ATTORNEY

Fig. 3

Feb. 6, 1951 P. W. HARLAND 2,540,444
PRESSURE-INDICATING GAUGE CLOSING
SWITCHES AT SELECTED PRESSURES
Filed April 30, 1948 9 Sheets-Sheet 4

INVENTOR
PHILIP W. HARLAND
BY Bruno Lechler
ATTORNEY

Feb. 6, 1951 P. W. HARLAND 2,540,444
PRESSURE-INDICATING GAUGE CLOSING
SWITCHES AT SELECTED PRESSURES
Filed April 30, 1948 9 Sheets-Sheet 5

Fig. 5

INVENTOR
PHILIP W. HARLAND
BY Bruno C. Liechler
ATTORNEY

Feb. 6, 1951  P. W. HARLAND  2,540,444
PRESSURE-INDICATING GAUGE CLOSING
SWITCHES AT SELECTED PRESSURES
Filed April 30, 1948  9 Sheets-Sheet 9

INVENTOR
PHILIP W. HARLAND
BY *Bruno Lechler*
ATTORNEY

Patented Feb. 6, 1951

2,540,444

UNITED STATES PATENT OFFICE 2,540,444

PRESSURE-INDICATING GAUGE CLOSING SWITCHES AT SELECTED PRESSURES

Philip W. Harland, Quakertown, Pa., assignor to American Machine and Metals, Inc., New York, N. Y., a corporation of Delaware Application April 30, 1948, Serial No. 24,144

9 Claims. (Cl. 200—56)

This invention relates to alarm gauges adapted to operate an alarm when a condition in a system to be controlled reaches a pre-determined value or one of several pre-determined values. The condition in response to which the alarm is to be operated may be either fluid pressure or a condition whose changes may be translated into changes of fluid pressure.

Fluid pressure responsive devices, such as Bourdon tubes or diaphragms, are sensitive instruments which, however, do not give a correct pressure reading if the device is compelled to exert a substantial mechanical force such as is necessary to actuate a mechanically operated switch in an alarm circuit, e. g. a precision switch. It is an object of the present invention to provide an alarm gauge which uses sensitive pressure responsive devices of the kind just mentioned in such a manner that the gauge will exactly indicate the pressure existing at any instant without incurring any time lag in the effective operation of the alarm switch when the pressure at which the actuation of the alarm is desired is actually reached. This object is obtained basically by providing in a unitary structure two pressure actuated devices, one being a pressure indicating mechanism and the other, which is distinct from the first, an alarm operating mechanism. The indicating mechanism may thus operate without coming into contact with any mechanical obstruction, whereas the other pressure operated device is not called upon to indicate any instantaneous pressures but is biased so that it will operate the switch at the desired pressure, notwithstanding the fact that this device after having come into contact with the switch to be operated must pause until the force behind it has become sufficient to actuate the switch.

Another object of the invention is to provide an alarm gauge wherein the alarm mechanism may be adjusted or calibrated with the aid of the pressure indicating mechanism.

The force required to actuate a switch, such as a precision switch, may be different for different switches and it is another object of the invention to provide an alarm gauge wherein the distance between the switch and the switch actuating member is adjustable for preconditioning said switch actuating member for switching the particular switch used when a pre-selected pressure is indicated by the indicating device. In a preferred form of the invention the switch is mounted in such manner that it may be moved toward or away from the switch actuating member to find that position where this actuating member, after having come into contact with the movable part of the switch, will snap the switch at precisely the desired pressure in the system as indicated by the other pressure responsive device.

It is a further object of the invention to provide an alarm gauge wherein the adjustments for setting the alarm for one or more pre-determined pressures as well as for the particular switch or switches used can be performed from the front side of the gauge under guidance by the indications of the indicating device of the gauge. This may be accomplished by mounting the switch on a carrier whose position is controllable by a cam on a shaft which extends through the dial of the gauge to the front side of the latter. Thus, the position of the precision switch or the like may be adjusted from the front side of the gauge by turning the protruding shaft until the switch opens or closes exactly when the indicating device indicates that the system is at the desired pressure.

It is another object of the invention to provide for each of the switches used in the gauge a hub-dial which can be calibrated after the final assembly of the gauge under guidance by the indications of the pressure indicating device of the gauge.

A further object of the invention is to provide in an alarm gauge two pressure responsive elements, one operatively connected to the movable part of an indicating device and the other to switch actuating means, and a sub-dial for each switch used in the gauge, each of the sub-dials being graduated to indicate the positions to which that sub-dial is to be set to cause the coordinated switch to become operated at a particular value of pressure or other condition actuating said indicating device.

It is another object of the invention to provide in an alarm gauge having two switches, each adapted to form part of an alarm circuit, an actuating member common to both said switches which is operatively connected to one of the two pressure responsive elements mentioned above, and to mount the two switches so as to be adjustable independently of each other for preconditioning the common switch actuating member for operation of one of the switches upon one pre-selected pressure and the other switch upon another pre-selected pressure as indicated by the indicating device of the alarm gauge to whose movable part the other pressure responsive element is operatively connected.

Other objects and features of the invention will appear as the description proceeds, reference being had to the accompanying drawings which show, by way of example, two embodiments of the invention in the application for the control of a desired maximum value and a desired minimum value of pressure, so that a signal is given if the pressure either exceeds one given value or falls below another given value. Figs. 1 to 7 of these drawings show the use of a Bourdon tube for moving the movable part of the indicating device and the use of a diaphragm for the alarm operating mechanism, whereas Figs. 8 to 10 show both the alarm operating mechanism and the pressure indicating mechanism actuated by Bourdon tubes. In particular—

Referring first to Figs. 1 to 7, the reference numeral 1 denotes the housing for the entire apparatus. This housing has a flange at its forward end, and hinged at 3 to this flange is a door 2 which may have a knob 4 so that the door may be opened for adjusting the gauge. The door 2 carries a glass window 5. The housing 1 carries a dial 6 which has two arcuate slots 7 and 8 whose function will appear later. The dial 6 carries graduations over which a pointer 10 plays to indicate the pressure in the system at any instant.

Attached to the back of the housing 1 is a main casting 11 which supports all of the working parts. This casting carries a threaded nipple 12 extending out through the housing. Through this nipple 12 passages 13 and 14 formed in the casting 11 receive fluid under pressure from the outside source which is to operate the gauge. The casting 11 carries a Bourdon tube assembly generally indicated at 15 and a diaphragm assembly generally indicated at 16. These two assemblies or units, 15, 16 of which the Bourdon tube unit 15 actuates the pointer 10 and the diaphragm unit 16 precision switches 34, 36 in the electrical circuits of the alarm, function completely independently of each other.

The Bourdon tube unit 15 has a Bourdon tube 17 supported on the casting 11 and connected with passage 13. The closed end of this Bourdon tube is connected by a link 18 to an extension 20 of a gear segment 21 which meshes with a pinion 22 mounted on a shaft 23 which carries the pointer 10.

Figure 1:
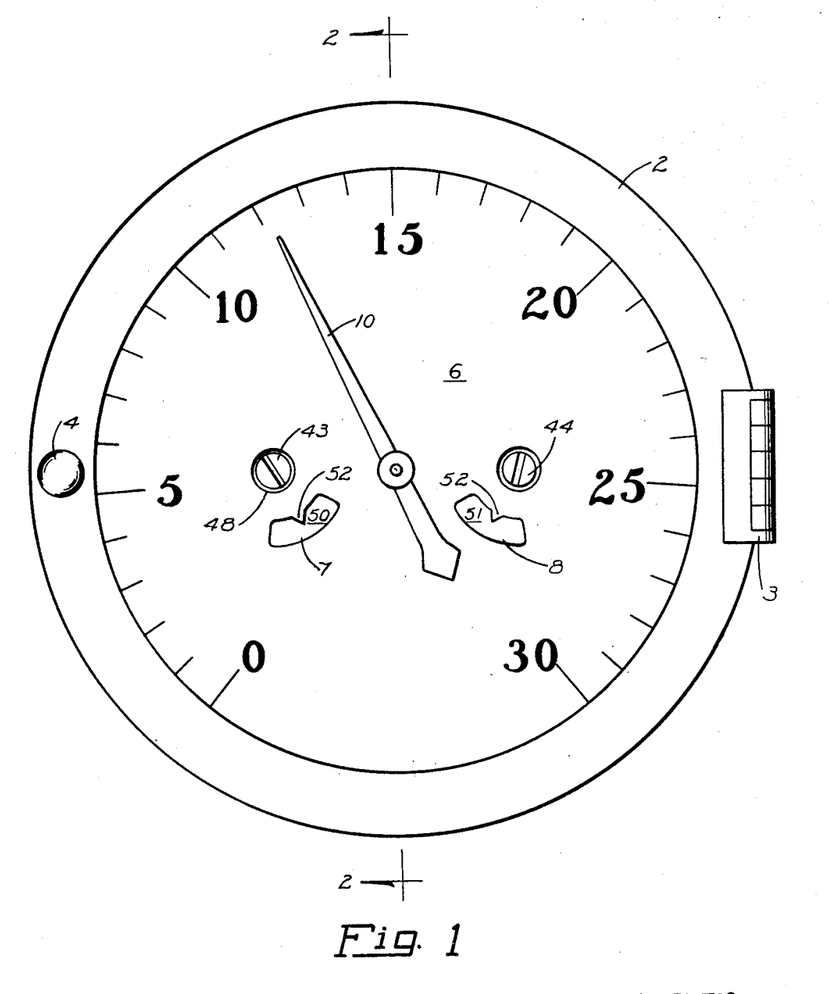
Fig. 1 is a front view of a gauge incorporating the first embodiment of the invention.
Figure 2:
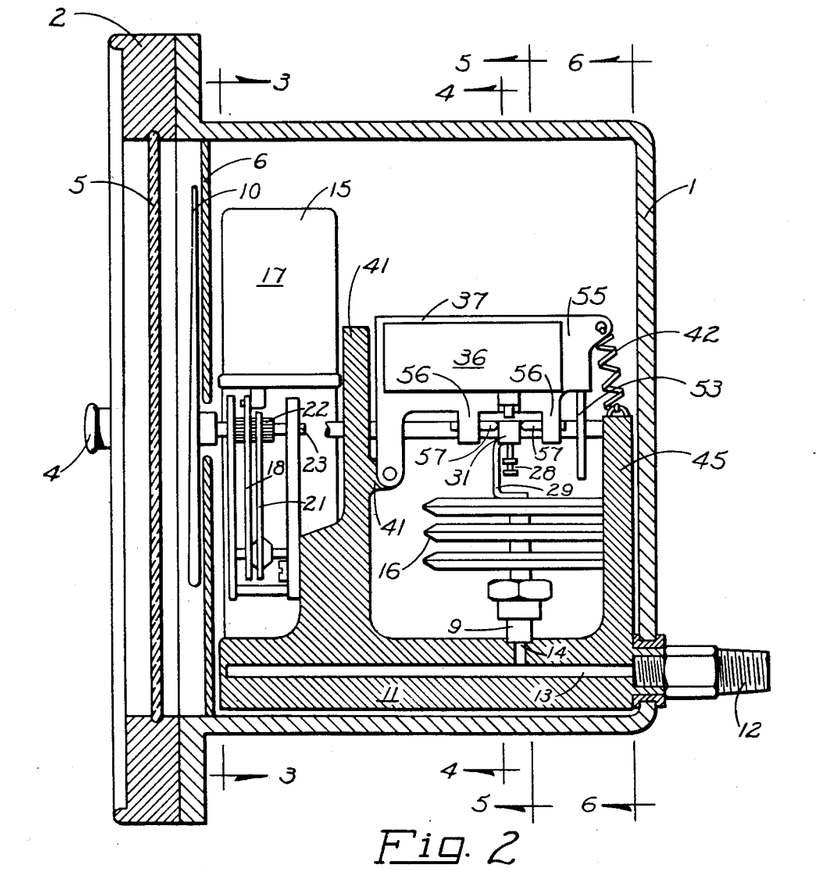
Fig. 2 is an elevation, partly in section, along line 2—2 in Fig. 1.
Figure 3:
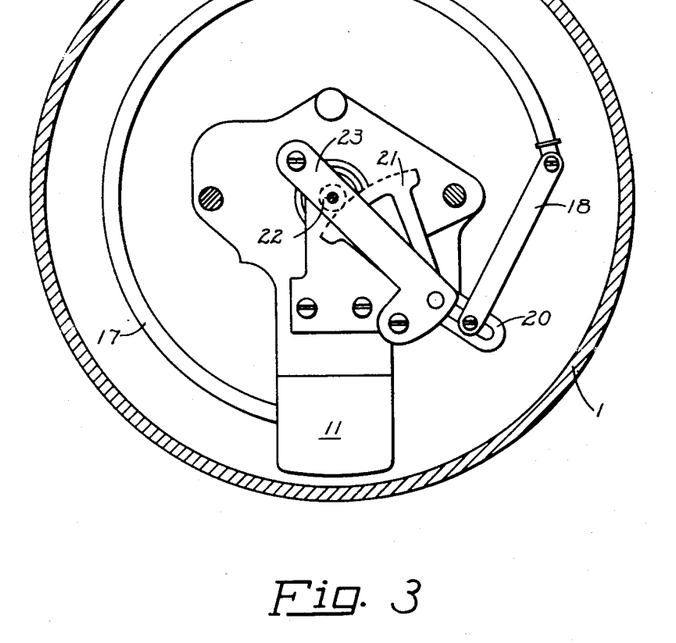
Fig. 3 is a vertical section along line 3—3 in Figs. 2 and 8.
Figure 5:
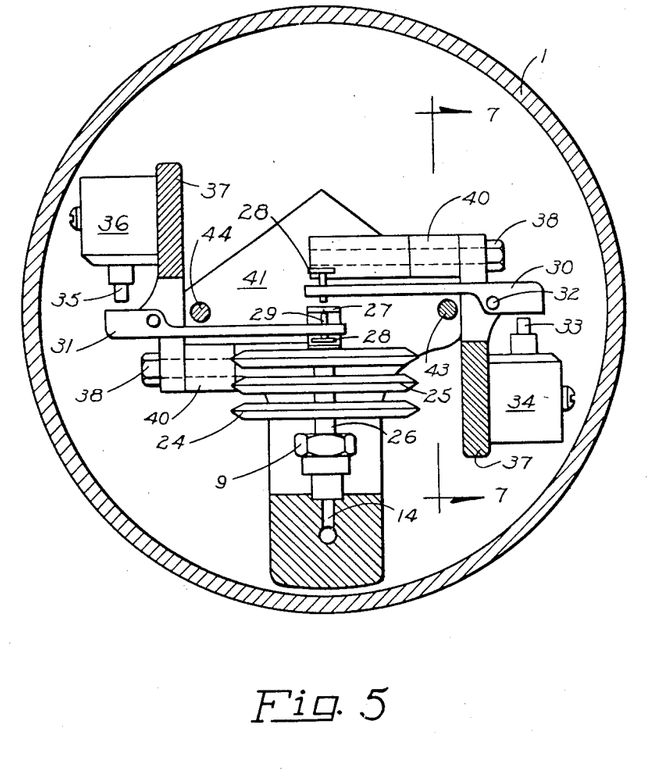
Fig. 5 is a section along line 5—5 in Fig. 2.

The diaphragm assembly 16, as shown in Figs. 2 and 5, consists of a number of hollow chambers 25 each formed by two dished discs 24 joined at their marginal flanges. Nipples 26 interconnect the hollow chambers 25 at their centers and the lowermost of the chambers 25 is connected through a nipple 9 to the passage 14 in the casting 11. Depending upon the pressure of the fluid in passage 14, each of the chambers 25 will be distorted and a U-shaped piece 29 attached to the uppermost chamber 25 will move a distance which is equal to the sum of the axial distortions of all the chambers 25. An upper horizontal leg 27 of the U-shaped piece 29 is provided to engage one or the other of two adjustable screws or pins 28 carried each by one of two levers 30, 31 each of which is adapted to actuate one of two precision switches 34, 36. The precision switch 34 becomes actuated when the gauge pointer 10 points to the upper limit of the range of pressure which the gauge is to control, whereas the precision switch 36 becomes actuated when the pointer 10 points to the lower limit of this range. The lever 30 for operating the precision switch 34 is pivoted at 32 so that, when the expanding diaphragm assembly 16 lifts the horizontal leg 27 of the U-shaped piece 29 and carries the screw 28 attached to lever 30 upwards a certain amount, the rear end of the lever 30 will press against the plunger 33 of the precision switch 34. Similarly, as the pressure decreases to a selected lower limit the horizontal leg 27 of piece 29 comes to bear against the other screw 28 carried by lever 31 and the latter will press against the plunger 35 of the precision switch 36.

Each of the two precision switches 34, 36 is attached to a carrier 37. Each carrier 37 is pivoted on a stud 38 which extends through a projecting part 40 of the carrier 37 and passes into a boss 41' on a vertical wall 41 which extends upwardly from the casting 11. Each of the carriers 37 has a projecting leg 55 to which there is attached a spring 42 fastened at its other end to a point at the top of a rear upward extension 45 of casting 11, thus tending to draw the coordinated carrier 37 together with its attached precision switch toward the horizontal axis in Fig. 4.

Figure 6:
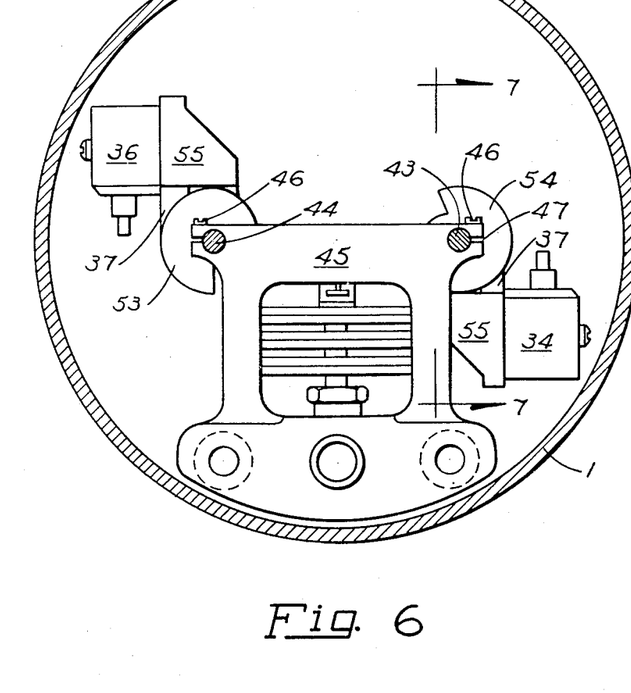
Fig. 6 is a section along line 6—6 in Fig. 2 showing the cams engaging the precision switch carriers.
Figure 7:
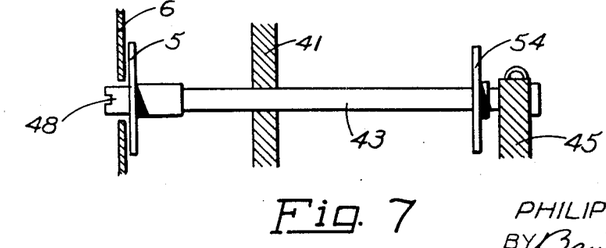
Fig. 7 is an elevation along line 7—7 in Fig. 5 showing one of the shafts carrying the cam and adjustment disc and its support.
Figure 7A:
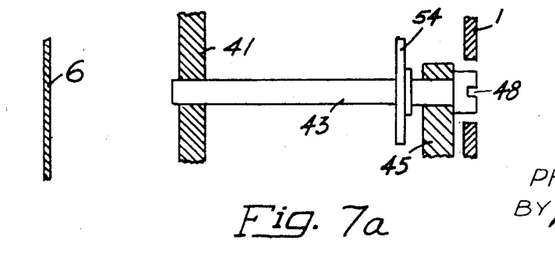
Fig. 7a shows an alternate construction.

Means are provided for adjusting the position of the switch carriers 37 at will. These means include a pair of shafts 43 and 44 carrying cams 53 and 54 which may be, e. g., of spiral shape. Figs. 7 and 7a show in detail shaft 43, which is of the same construction as shaft 44. Both shafts 43, 44 are supported in the vertical parts 41 and 45 of the casting 11 and in particular, as shown in Fig. 6, they are held in slots 47 of the wall 45. Tightening screws 46 permit contracting of each slot 47 sufficiently to give enough friction for keeping the shafts 43 and 44 in any desired angular position. Fig. 7a shows the shaft having a slot 48 at the rear end for adjustment by a screwdriver from the back of the housing. Fig. 7 shows another arrangement in which the front ends of shafts 43 and 44 project through dial 6 and has formed at this end a slot 48 to receive a screwdriver by means of which either shaft 43 or 44 may be turned to the required angular position. In the form shown in Fig. 7, each of the shafts 43, 44 carries a sub-dial 50, 51 respectively, which is situated just behind the dial 6 so that these sub-dials may be observed through the previously mentioned slots 7, 8 in the dial 6 from the front of the latter. Each of these slots 7, 8 may carry an indicating pointer 52.

Each of the carriers 37 is drawn by its spring 42 against the edge of its coordinated cam 53 or 54 on the shafts 43, 44. When either of the shafts 43 or 44 is turned through a part of a revolution by means of a screw driver placed into slot 48, the spiral cam attached to that shaft alters the vertical position of the carrier 37 and its attached precision switch.

Figure 4:
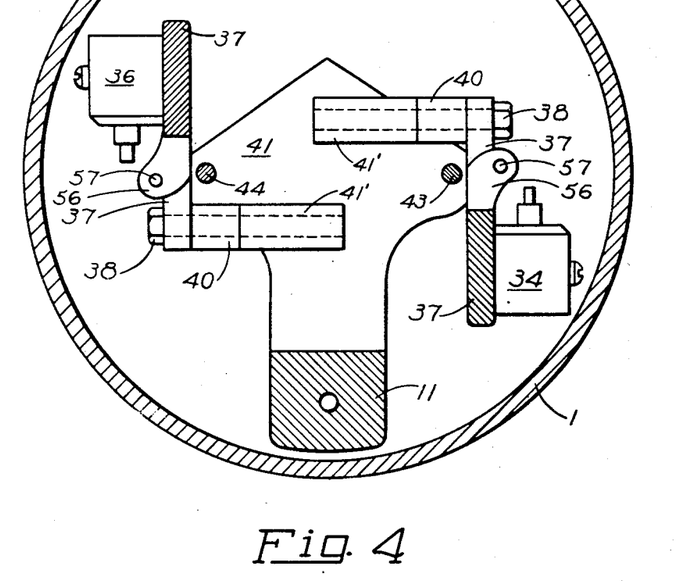
Fig. 4 is a section along line 4—4 in Fig. 2.

As will be seen from Figs. 2 and 4, each carrier 37 has two projecting ears 56 each of which carries a pivot point 57. Between the two pivot points 57 of each carrier 37 one of the levers 30, 31 is supported so that each of these levers always remains in a fixed relationship to its coordinated precision switch 34 or 36.

The apparatus is calibrated after it has been centered, the sub-dials 50, 51 having been left blank for that purpose. The pressure in the line connected to the nipple 12 is raised until the pointer 10 indicates a selected pressure, such as 10 lbs. per sq. inch. A screwdriver is now inserted in shaft 44 controlling the lower limit at which the alarm is to work and the shaft is turned until the spiral cam 53 thereon moves the carrier 37 of switch 36 to a point where the lever 31 is forced by the diaphragm assembly 16 against that precision switch 36 with sufficient force to give the low level alarm. The numeral 10 is now inscribed on the sub-dial 51 in line with the indicating point 52.

The screwdriver is now moved to the other shaft 43 and the latter is turned until the spiral cam 54 on said shaft 43 moves its carrier 37 to the point where the precision switch 34 carried by the carrier gives an alarm. The sub-dial 50 is now inscribed with the numeral 10 in line with the indicating point 52. The pressure in the conduit connected to the nipple 12 is now increased to some other calibrating value, such as 20 lbs., and the same procedure is repeated. In this manner, the two sub-dials 50 and 51 are calibrated so that, whenever thereafter either sub-dial is turned to a given value appearing in the coordinated slot 7 or 8 by operating the screwdriver inserted in the slot 48 of the coordinated shaft 43 or 44, the spiral cam on that shaft will again move its carrier and its attached precision switch into the position where the device will give an alarm of that value.

The alarm gauge will thereafter always give an alarm when the pressure in the conduit connected to the nipple 12 drops to the pressure indicating on sub-dial 51 and will always give another alarm when the pressure rises to the value indicated on sub-dial 50.

Figure 8:
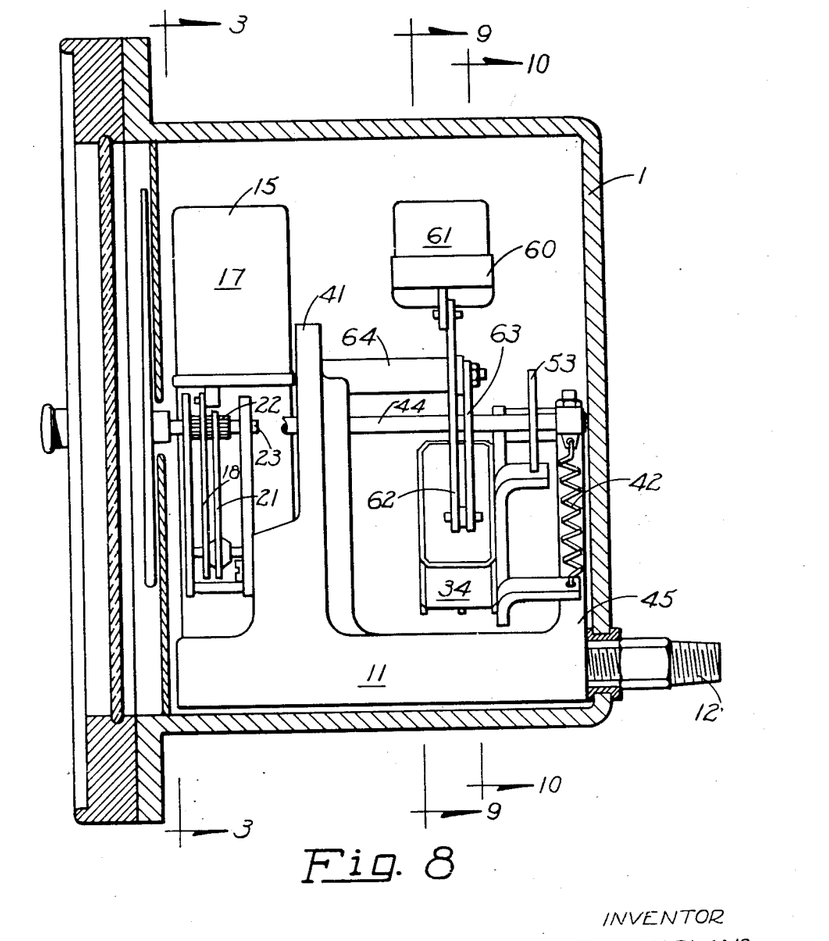
Fig. 8 is an elevation, partly in section, taken along line 2—2 in Fig. 1, showing the above mentioned modified form of the invention. For greater clarity the upper precision switch and its carrier have been removed.
Figure 9:
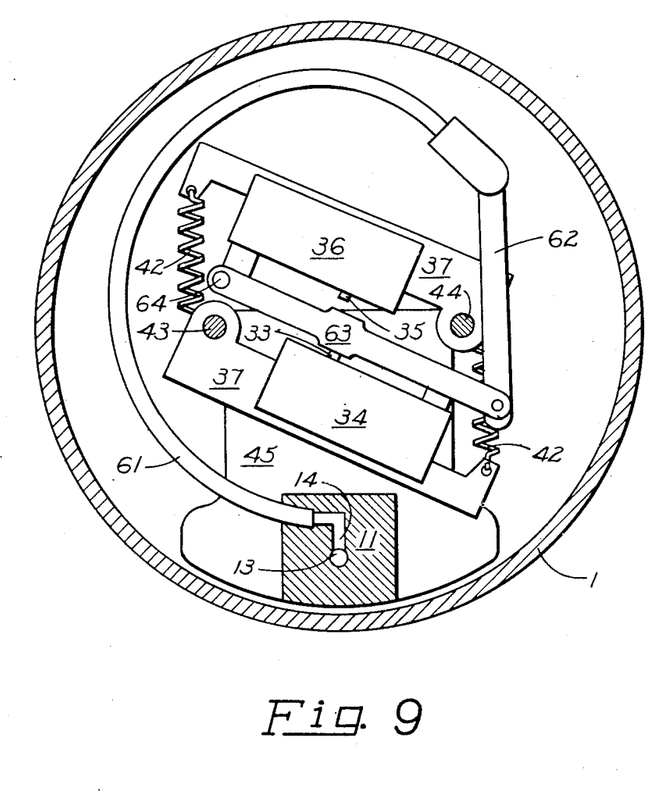
Fig. 9 is an elevational view taken along line 9—9 in Fig. 8.
Figures 10, 11:
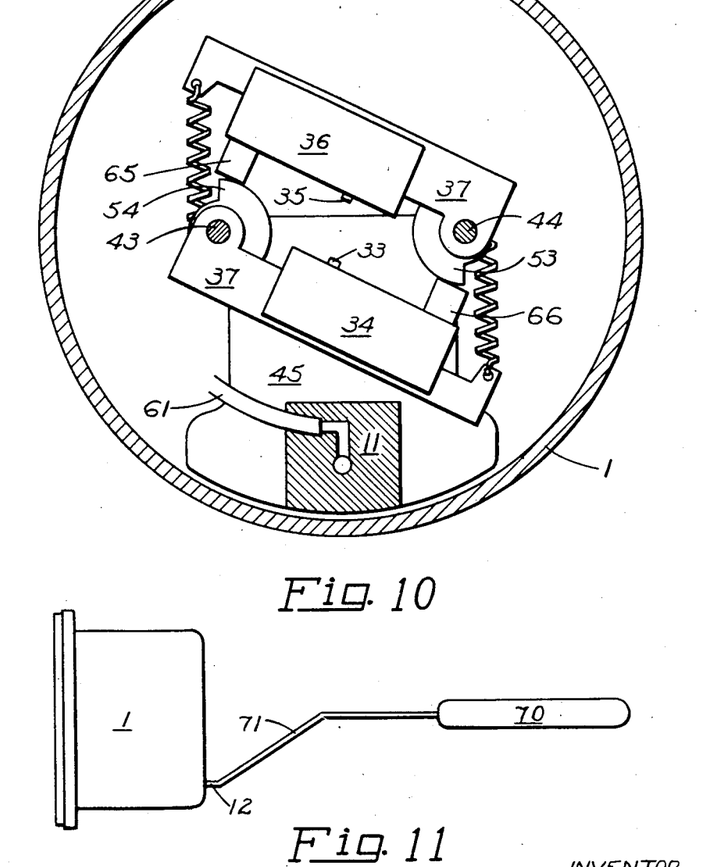
Fig. 10 is an elevational view taken along line 10—10 in Fig. 8.
Fig. 11 shows diagrammatically a temperature controlled device.

In the modified form of the invention shown in Figs. 8–10 the diaphragm unit which was used in the just described embodiment for actuating the precision switches is replaced by a Bourdon tube unit generally indicated at 60, that is to say, Bourdon tube units are used for the pressure indicating mechanism as well as for the alarm operating mechanism. The unit 60 comprises a Bourdon tube 61 which connects through passage 14 with passage 13. The closed end of the Bourdon tube 61 is connected to one end of a link 62 whose other end is connected to a lever 63. The lever 63 is pivoted on the end of a post 64 which extends out rearwardly from the vertical wall 41.

The precision switches 34 and 36 are mounted on carriers 37 as before. However, each of these carriers 37 is loosely supported at one end of the shafts 43 and 44 which are used for adjusting the position of the precision switches. The other end of each carrier is urged toward the horizontal axis of Fig. 9 by the spring 42. Each spring is hooked at one end to the free end of the coordinated carrier 37 and at the other end to the rear vertical extension 45 of the casting 11 as shown in Fig. 8.

In Fig. 10 the Bourdon tube link 62 as well as the lever 63 have been removed to show more clearly the functioning of the cams 53 and 54.

As the lever 63 swings up or down about the pivot 64 in accordance with the movements of the Bourdon tube 61 it may engage the plungers 33 and 35, respectively, of the precision switches 34 and 36. When this happens depends on the position of the carriers 37 which are adjustable by means of the cams 54, 53 on the shafts 43, 44.

To adjust the carrier 37 carrying the switch 36, and thereby the upper limit alarm, a screwdriver is inserted in the slot 48 of the shaft 43. As this shaft 43 is turned, the position of the lower carrier 37 will not be affected, since it rides loosely on the shaft 43, but the cam 54, which is attached to the shaft 43, will turn with the latter and either will push the projecting part 65 of the upper carrier 37 farther away from the axis of the shaft 43 increasing thereby the distance of the plunger 35 of the switch 36 from the lever 63 or will permit the coordinated spring 42 to draw the upper carrier 37 closer to said axis of shaft 43, decreasing thereby the distance of the plunger 35 from the lever 63. In either case the carrier 37 turns about the axis of the shaft 44. Similarly, when the screwdriver is used to adjust the position of shaft 44, the position of the upper carrier 37 will not be affected since it rides loosely on the shaft, but the cam 53 which bears against the projection 66 of the lower carrier 37 will turn with the shaft 44 and will, in cooperation with the coordinated spring 42, cause this lower carrier 37 to increase or decrease its distance from the lever 63.

While Figs. 1 to 10 illustrate two particular embodiments of the invention, I desire it to be understood that these embodiments have been given by way of example only and that various changes and modifications in the details of the construction may be made without departing from the spirit of the invention or the scope of the appended claims. For example, while I have shown the indicating device of the gauge as consisting of a fixed dial 6 and a movable pointer 10, a movable dial cooperating with a fixed indicator might be used and instead of a disk shaped dial a cylindrical dial is applicable. On the other hand, the rotatable sub-dials 50, 51 cooperating with fixed marks 52 could be replaced by the combination of fixed sub-dials cooperating with pointers turnable with the shafts 43, 44. In this case the fixed dial 6 would preferably carry all three graduations, the one shown in Fig. 1 upon which the pointer 10 plays and two graduations around the axes of the shafts 43 and 44. It will also be obvious that, while in the two examples shown the variation of the distances between the switches and the actuating members is brought about by moving the switches, arrangements can be devised in which either the switch actuating member or members are movable relative to stationary switches or in which switches as well as actuating members are movably mounted. The variations just mentioned are again mentioned as examples only because substitution of details of construction other than those just discussed by equivalent means will be obvious to those skilled in the art.

It is also to be understood that while in the gauge itself pressure responsive elements are used, the condition to be supervised by the gauge is not necessarily the condition of pressure but may be any condition whose changes may be translated into changes of fluid pressure. Thus the gauges shown in Figs. 1 to 10 may be used for the supervision of temperature and Fig. 11 shows in a diagrammatic manner an application of the invention to such purpose. In Fig. 11, 1 denotes the housing of the gauge whose construction may be either in accordance with Figs. 2 to 7 or with Figs. 8 to 10. 12 denotes the nipple extending out of the back of the housing 1 as is shown in Fig. 2 or Fig. 8. Connected to the nipple 12 by means of a conduit 71 is a closed container 70 which contains a volatile liquid. The container 70 is surrounded by a medium, such as a liquid or gas, whose temperature is to be supervised. As the temperature of this surrounding medium changes the pressure of the volatile liquid in the container 70 changes, the pressure created in the container being a function of said outside temperature. Thus the precision switches 34 and 36 within the housing 1 will become actuated upon the medium surrounding the container 70 reaching certain predetermined temperatures and accordingly the dial 6 as well as the sub-dials 50, 51 shown in Fig. 1 may be graduated in degrees of temperature instead of in units of pressure.

What I claim is:

1. An alarm gauge, comprising a dial, a pointer movable over said dial, a precision switch attached to a pivotally mounted carrier, an actuating member for actuating said precision switch, two pressure responsive elements, one operatively connected to said pointer and the other to said switch actuating member, means for adjusting the position of said switch carrier including a cam carried by a shaft and held in contact with said carrier by spring means, said shaft extending through said dial to the front side of the gauge so as to be manually operable from said front side, a graduated sub-dial secured to said shaft at a point behind said dial, and a sight opening in said dial permitting observation of the part of the graduation on said sub-dial corresponding to the manual adjustment of said shaft which will cause said precision switch to be actuated by one of the pressure responsive elements when the pointer controlled by the other pressure responsive element indicates the pressure at which it is desired that the alarm is given.

2. An alarm gauge, comprising a dial, a pointer movable over said dial, a pair of precision switches each attached to a pivotally mounted carrier, an actuating member for each of said precision switches, two pressure responsive elements, one operatively connected to said pointer and the other to said switch actuating members, means for adjusting the position of said two switch carriers independently of each other, said adjusting means for each switch carrier including a cam carried by a shaft and held in contact with its coordinated carrier by spring means, both said shafts extending through said dial to the front side of the gauge so as to be manually operable from said front side, a graduated sub-dial secured to each of said shafts at a point behind said dial and two sight openings in said dial, one for each of said sub-dials, permitting observation of that part of the graduation on the coordinated sub-dial corresponding to the manual adjustment of the coordinated shaft which will cause said precision switch to be actuated by one of the pressure responsive elements when the pointer controlled by the other pressure responsive element indicates the pressure at which it is desired that the alarm is given.

3. An alarm gauge, comprising a dial, a pointer movable over said dial, a precision switch attached to a pivotally mounted carrier, an actuating member for actuating said precision switch, two pressure responsive elements, one operatively connected to said pointer and the other to said switch actuating member, means for adjusting the position of said switch carrier including a cam carried by a shaft and held in contact with said carrier by spring means, said shaft extending through said dial to the front side of the gauge so as to be manually operable from said front side, a sub-dial secured to said shaft at a point behind said dial, and an opening in said dial permitting calibration of said sub-dial after final assembly of the gauge to indicate the pressure as indicated by the pointer on the scale at which the alarm will be given.

4. An alarm gauge, comprising a dial, a pointer movable over said dial, a pair of precision switches each attached to a pivotally mounted carrier, an actuating member for each of said precision switches, two pressure responsive elements, one operatively connected to said pointer and the other to said switch actuating members, means for adjusting the position of said two switch carriers independently of each other, said adjusting means each including a cam carried by a shaft and held in contact with said carrier by spring means, said shafts extending through said dial to the front side of the gauge so as to be manually operable from said front side, a sub-dial secured to each of said shafts at a point behind said dial, and two openings in said dial, one for each sub-dial, permitting calibration of said sub-dials after final assembly of the gauge to indicate the same pressure as will be indicated by the pointer on the main scale when the alarm will be given.

5. An alarm gauge comprising a dial, a pointer movable over said dial, a pair of precision switches each attached to a carrier, an actuating member for each of said precision switches, two pressure responsive elements, one operatively connected to said pointer and the other to said switch actuating member, means for adjusting the position of said two switch carriers independently of each other, said adjusting means for each switch carrier including a cam carried by a shaft and held in contact with its coordinated carrier by spring means, each of said carriers being swingably mounted on the shaft carrying the cam for adjusting the respective other carrier, both said shafts extending through said dial to the front side of the gauge so as to be manually operable from said front side, a graduated sub-dial secured to each of said shafts at a point behind said dial, and two sight openings in said dial, one for each of said sub-dials, permitting observation of that part of the graduation on the two sub-dials corresponding to the manual adjustment of the respectively coordinated shaft.

6. An alarm gauge comprising a dial, a pointer movable over said dial, a pair of precision switches each attached to a carrier, an actuating member for each of said precision switches, two pressure responsive elements, one operatively connected to said pointer and the other to said switch actuating members, means for adjusting the position of said two switch carriers independently of each other, said adjusting means for each switch carrier including a cam carried by a shaft and held in contact with its coordinated carrier by spring means, each of said carriers being swingably mounted on the shaft carrying the cam for adjusting the respective other carrier, both said shafts extending through said dial to the front side of the gauge so as to be manually operable from said front side, a sub-dial secured to each of said shafts at a point behind said dial, and two sight openings in said dial, one for each of said sub-dials, permitting calibration of said sub-dials after final assembly of the gauge under guidance by the indications of said pointer on said dial.

7. An alarm gauge comprising a dial, a pointer movable over said dial, a pair of precision switches each attached to a carrier, an actuating member common to both of said precision switches, two pressure responsive elements, one operatively connected to said pointer and the other to said common switch actuating member, means for adjusting the position of said two switch carriers independently of each other, said adjusting means for each switch carrier including a cam carried by a shaft and held in contact with its coordinated carrier by spring means, each of said carriers being swingably mounted on the shaft carrying the cam for adjusting the respective other carrier.

8. An alarm gauge comprising a dial, a pointer movable over said dial, a pair of precision switches each attached to a carrier, an actuating member common to both of said precision switches, two pressure responsive elements, one operatively connected to said pointer and the other to said common switch actuating members, means for adjusting the position of said two switch carriers independently of each other, said adjusting means for each switch carrier including a cam carried by a shaft and being held in contact with its coordinated carrier by spring means, each of said carriers being swingably mounted on the shaft carrying the cam for adjusting the respective other carrier, both said shafts extending through said dial to the front side of the gauge so as to be manually operable from said front side.

9. An alarm gauge comprising a dial, a pointer movable over said dial, a pair of precision switches each attached to an actuating member common to both said precision switches, two pressure responsive elements, one operatively connected to said pointer and the other to said common switch actuating member, means for adjusting the position of said two switch carriers independently of each other, said adjusting means for each switch carrier including a cam carried by a shaft and held in contact with its coordinated carrier by spring means, each of said carriers being swingably mounted on the shaft carrying the cam for adjusting the respective other carrier, both said shafts extending through said dial to the front side of the gauge so as to be manually operable from said front side, a graduated sub-dial secured to each of said shafts at a point behind said dial, and two sight openings in said dial, one for each of said sub-dials permitting calibration of said sub-dials after final assembly of the gauge under guidance by the indications of said pointer on said dial.

PHILIP W. HARLAND.

REFERENCES CITED

The following references are of record in the file of this patent:

UNITED STATES PATENTS

| Number | Name | Date |
| --- | --- | --- |
| 1,074,137 | Schubert | Sept. 30, 1913 |
| 1,415,050 | Reichart | May 9, 1922 |
| 1,767,636 | Wilhjelm | June 24, 1930 |
| 1,857,311 | Kolloman | May 10, 1937 |
| 2,274,329 | Hammond | Feb. 24, 1942 |
| 2,300,895 | Hopkins | Nov. 3, 1942 |